United States Patent
Cherneff et al.

(10) Patent No.: US 6,233,493 B1
(45) Date of Patent: May 15, 2001

(54) COMPUTER-IMPLEMENTED PRODUCT DEVELOPMENT PLANNING METHOD

(75) Inventors: Jonathan M. Cherneff, Milton; Krishna Kumar, Cambridge, both of MA (US)

(73) Assignee: i2 Technologies, Inc., Dallas, TX (US)

( * ) Notice: Subject to any disclaimer, the term of this patent is extended or adjusted under 35 U.S.C. 154(b) by 0 days.

(21) Appl. No.: 09/154,373

(22) Filed: Sep. 16, 1998

(51) Int. Cl.[7] .................................................. G06F 19/00
(52) U.S. Cl. ............................... 700/95; 700/96; 700/97; 700/99; 700/103; 706/13
(58) Field of Search ........................... 705/7–8; 700/213; 706/13–14, 10; 703/2, 14

(56) References Cited

U.S. PATENT DOCUMENTS

| | | | |
|---|---|---|---|
| 5,148,513 | * 9/1992 | Koza et al. | 706/13 |
| 5,285,383 | * 2/1994 | Lindsey et al. | 705/26 |
| 5,291,394 | 3/1994 | Chapman | 364/401 |
| 5,311,438 | 5/1994 | Sellers et al. | 364/468 |
| 5,319,781 | * 6/1994 | Syswerda | 705/8 |
| 5,343,554 | * 8/1994 | Koza et al. | 706/13 |
| 5,390,282 | * 2/1995 | Koza et al. | 706/13 |
| 5,541,848 | * 7/1996 | McCormack et al. | 705/7 |
| 5,819,244 | * 10/1998 | Smith | 706/13 |
| 5,867,397 | * 2/1999 | Koza et al. | 703/14 |

FOREIGN PATENT DOCUMENTS

| | | | |
|---|---|---|---|
| 254825B1 | * 1/1994 | (EP) | G06F/9/44 |
| 3027128B2 | * 1/1994 | (JP) | G06F/19/00 |
| 11096274 | * 4/1999 | (JP) | G06F/19/00 |

OTHER PUBLICATIONS

Frank–Lothar Krause et al., "Modellieren für die Produktentwicklung," IT + TI Informationstechnik und Technische Informatik, vol. 37, No. 5, pp. 11–17, Oct. 1, 1995.

Yuh–Min Chen et al., "A Structured Methodology for Implementing Engineering Data Management," Robotics and Computer Integrated Manufacturing, vol. 14, No. 4, pp. 275–296, Aug. 1, 1998.

William R. Lilegdon et al., "Manufacturing Decision Making with Factor," Proceedings of the 1994 Winter Simulation Conference, pp. 420–426, Nov. 12, 1994.

Lawton, "Genetic Algorithms for chedule optimization", AI expert, pp. 23–27, May 1992.*

Goldberg, "A gentle introduction to genetic algorithms", Genetic Algorithms in Search, Optimization, and Machine Learning, (Addison–Wesley) pp. 170 et seq., 1989.*

Falkenauer et al., "A genetic algorithm for job shop", Proc. of 1991 IEEE Int. Conf. on Robotics & Aut., Sacramento, Calif., pp. 824–829, Apr. 1991.*

"Demand modeling & forecasting system", Business Software Database, TM., available in Dialog, File No. 256, Aug. 1993.*

Brennan, "Portfolio managers weather global risk management challenge", Wall Street Computer Review 7(1):20, May 1992.*

\* cited by examiner

Primary Examiner—Vincent Millin
Assistant Examiner—Cuong H. Nguyen
(74) Attorney, Agent, or Firm—Baker Botts L.L.P.

(57) ABSTRACT

A computer-implemented system (10) for product development planning. The system (10) models a business enterprise in terms of its proposed products and the tasks and resources used to develop them. A optimizing engine comprised of a genetic algorithm (13) and a constraint engine (14) operates on the model to construct candidate product portfolios and schedules. Each schedule is evaluated and used to generate an "improved" candidate portfolio in accordance with genetic processing. This process continues to improve the product prioritization and pipeline schedule as measured in terms of an objective criterion such as profit maximization.

28 Claims, 7 Drawing Sheets

Project Portfolio

| Name | FinishDate | Duration | ROI | NPV |
|---|---|---|---|---|
| Chevrolet Cavalier | 1998-09-01... | 11 Months | 32%-48% | 1.5-3.5 |
| Chevrolet Lumina | 1998-09-01... | 6 Months | 31%-35% | 3.5-3.8 |
| Buick Regal | 1999-01-01... | 8 Months | 23%-42% | 1.5-2.3 |

Cockpit | Resources | Rhythm TTM 1.0 | Rhythm Sequencer 2.0

Financial Detail

| Pl... | Category | FY_1998 | FY_1999 | FY_2000 | FY_2001 |
|---|---|---|---|---|---|
| 1 | Market Size | 200 | 1000 | 3000 | 8000 |
| 2 | Market Share | 0% | 30% | 50% | 50% |
| 3 | Units Sold | 0 | 300 | 1500 | 4000 |
| 4 | Price | 0 | 10 | 10 | 10 |
| 5 | Unit Cost | 0 | 4 | 2 | 2 |
| 6 | Total Revenue | 0 | 3000 | 15000 | 40000 |
| 7 | Total Cost | 0 | 1200 | 3000 | 8000 |
| 8 | Gross Profit | 0 | 1800 | 12000 | 32000 |
| 9 | Overhead | 500 | 500 | 5000 | 12000 |
| 10 | Development C... | 5000 | 1000 | 1000 | 1000 |
| 11 | Net Profit | (5500) | 300 | 6000 | 19000 |

FIG. 7

Task Start And Finish Times                     Product [PPN ▽]

|   | Name | ActualStart | ActualFinish | PredDuration | PredVarian |
|---|------|-------------|--------------|--------------|------------|
| 1 | Produce Gizmo | 1998-04-15 | 1998-04-19 | 5 | |
| 2 | Make Component | | | 6 | |
| 3 | Make Component | | | | |
| 4 | Buy Part X | | | 5 | |
| 5 | Build Component | | | 12 | |
| 6 | Make Widget 2 | | | 13 | |
| 7 | MakeOrBuy Widget 1 | | | 14 | |
| 8 | Make Widget 3 | | | 9 | |
| 9 | Buy Widget 30 | | | | |
| 10 | Buy Camera | 1998-05-14 | 1998-05-17 | 3 | |

Applet started.

Scenario Impact

| Criteria | Before | After | Impact |
|---|---|---|---|
| Portfolio ROI | 30.5% | 32% | +1.5% |
| Portfolio NPV | 3,000,000 | 3,600,000 | +600,000 – +20% |

New Projects

| Name | FinishDate | Duration | ROI | NPV |
|---|---|---|---|---|
| Cadillac Catera | 1999-01-15 00... | 18 Months | 15%-52% | 3.6-9.0 |
| Oldsmobile Cutlass | 1999-02-01 00... | 32 Months | 34%-67% | 20.5-36.7 |

Financial Detail

| Place | Category | FY_1998 | FY_1999 | FY_2000 | FY_2001 |
|---|---|---|---|---|---|
| 1 | Market Size | 200 | 1000 | 3000 | 8000 |
| 2 | Market Share | 0% | 30% | 50% | 50% |
| 3 | Units Sold | 0 | 300 | 1500 | 4000 |
| 4 | Price | 0 | 10 | 10 | 10 |
| 5 | Unit Cost | 0 | 4 | 2 | 2 |
| 6 | Total Revenue | 0 | 3000 | 15000 | 40000 |
| 7 | Total Cost | 0 | 1200 | 3000 | 8000 |
| 8 | Gross Profit | 0 | 1800 | 12000 | 32000 |

Tabs: Cockpit | Resources | Rhythm TTM 1.0 | Rhythm Sequencer 2.0 | Start Projects Scenario 1

FIG. 10

COMPUTER-IMPLEMENTED PRODUCT DEVELOPMENT PLANNING METHOD

TECHNICAL FIELD OF THE INVENTION

This invention relates to computer implemented management for business enterprises, and more particularly to a system and method for planning a portfolio of products to be developed.

BACKGROUND OF THE INVENTION

Computer implemented planning and scheduling systems are increasingly being used in factories and other enterprises. Such systems model the enterprise environment and provide schedules for producing items to fulfill consumer demand within the constraints of the environment.

Typically, planning and scheduling problems can be represented as a constrained optimization problem. For example, consider the problem of sequencing a set of tasks on a single resource in a manufacturing environment. Assume each task has a deadline and that the objective is to schedule each task so that it is completed by its deadline. One way to view this problem is as a search in a space of start times. Under this view, the problem is a constrained optimization problem in which the variables are the start times, the constraint is that no tasks can overlap, and the objective is not missing deadlines.

One enterprise activity whose scheduling and planning problems have not been adequately addressed by computer-implemented methods is new product development. Companies rely on new product development to achieve strategic positioning or increase revenue growth. This places an emphasis on optimizing the enterprise's product portfolio, that is, the selection of what products to make and the associated resource scheduling.

Many existing techniques and tools that have been developed for other types of enterprise management can be applied to portfolio planning. For example, a supply chain management system is available from i2 Technologies, Inc. of Irving, Tex. Many of the modeling structures and processes used for supply chain management can be applied to product development management. However, unique problems that arise in portfolio planning give rise to a need for a model especially formulated for product development.

SUMMARY OF THE INVENTION

One aspect of the invention is a system for providing data representing an "optimal" product portfolio, for use in enterprise product development management. The system has an optimizing engine that uses both a genetic algorithm and a constraint engine. The optimizing engine operates on an enterprise model having the following components: product models representing products proposed to be manufactured by said enterprise, component models representing components from which products are made, task models representing tasks to be performed in the development of a component, and resource models representing resources available for use in performing tasks. The genetic algorithm is used to provide sequences of products as candidates for the portfolio. The constraint engine builds a schedules for each sequence, subject to constraints of the model. The genetic algorithm and constraint engine cooperate in an iterative process to evaluate each sequence in terms of constraint violations of constraints associated with the model, and to provide better sequences. The result of this process is a "best" portfolio, that is, one that best satisfies constraints, as well as data representing a pipeline for developing the portfolio. Constraint violations can be translated to an objective criteria, such as profit such that the optimization is in terms of profit maximization.

An advantage of the invention is that optimizes a product portfolio subject to the constraint of the product pipeline. The system rapidly converges to a good solution but is also able to quickly propagate incremental changes to the schedule.

DETAILED DESCRIPTION OF THE INVENTION

Figure 1:
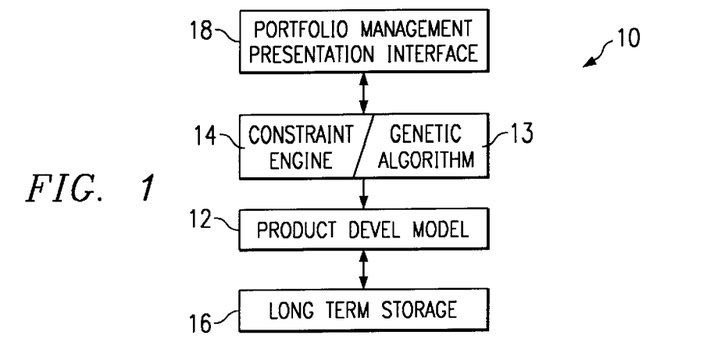
FIG. 1 illustrates a product development management system in accordance with the invention.

FIG. 1 is a block diagram of the software architecture of a computer implemented product portfolio management system 10 in accordance with the invention. System 10 can be implemented on a computer having typical computer components, such as a processor, memory, storage devices, and input and output devices. In operation, system 10 is used to present product scenarios and to provide product portfolios that optimize a certain goal, such as profit maximization.

The typical user of system 10 is a manufacturing enterprise with some degree of product turnover. Some such enterprises may have tens or hundreds of products in consideration for development at any time. Often, product launch time is critical because of finite sales windows. Examples of such industries are the high-tech, consumer electronics, automotive, and pharmaceutical industries. The enterprise uses system 10 to manage product development activities. That is, system 10 assists in the determination of what products to develop and where and when to develop them.

One component of system 10 is a model 12 of the product development process. As explained below, model 12 models the business enterprise in terms of proposed and active products. Products have components, which require tasks, which use resources. The model 12 represents a product portfolio, as well as its pipeline, that is, the set of all tasks and resources for the portfolio.

Genetic algorithm 13 uses model 12 to generate various product priority sequences, which are then scheduled and evaluated. Constraint engine 14 uses model 12 to builds these schedules, that is, the tasks required to develop products and to assign resources to the tasks. In the example of this description, constraint engine 13 and genetic algorithm 14 are separate processes. However, system 10 could be also used with an engine 13 that integrates the functions of both.

For long term storage, model 12, genetic algorithm 13, and constraint engine 14 are stored in long term storage memory 16. However, during operation of the invention for solving portfolio management problems, these components of system 10 are maintained in active computer memory for speed and efficiency.

A presentation interface 18 provides an interactive visualization for the user. Various views are appropriate for different aspects of the planning process and for different personnel.

System 10 may be implemented using object-oriented techniques. As explained below, object orientation concepts provide a highly interactive user interface as well as an internal representation that fairly represents a complex enterprise.

Typically, system 10 is implemented on a network of computers, such as a client-server system. In fact, the typical application of system 10 will be as a distributed system, where various personnel at different workstations may be provided with information relevant to the decisions encompassed by their job function. For example, as explained below, system 10 provides different views for personnel such as portfolio manager, master planner, line manager, and project manager.

The Product Development Model

Figure 2:
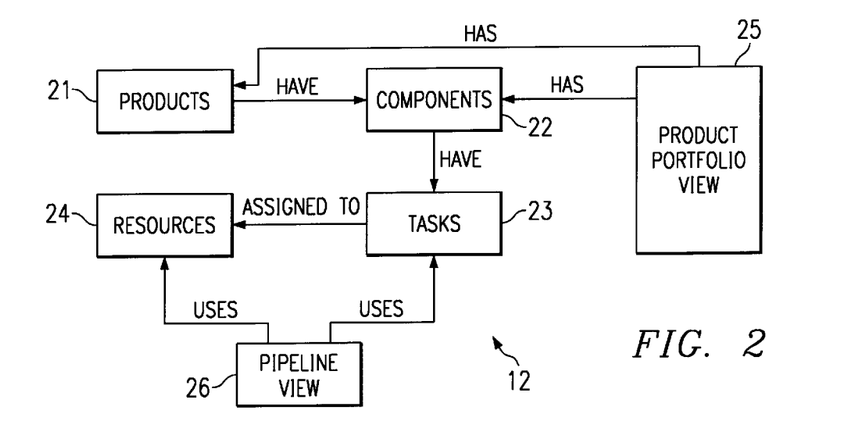
FIG. 2 illustrates the product development model of FIG. 1.

As illustrated in FIG. 2, model 12 is comprised of a number of model types, each with associated attributes. Each model type is used to define model instances. For each model type, the various models derived for them comprise the overall product development model 12.

For example, product model type 21 is used to define various product models, each of which represents a product proposal, that is, a product that the enterprise might produce. Products are described in terms of their breakdown in components. A product may be "active" or "inactive". In general, a product that is included in the product portfolio 26 thereby become an active product; otherwise, it is a product proposal. Examples of other attributes of the product model type 21 are: stages, strategic value, and various financial measures. The latter include projected total life-cycle sales as a function of the product's completion date, as well as a projected production cost that varies over time.

The component model type 22 defines component models, which represent the components of each product. Examples of other attributes of the component model type 22 are: a task network, sales multipliers, precedence relations to other components, production (not development) costs, and production capacities. The task network for a component is one or more tasks representing the work needed to build the component, and the task durations and dependencies. Components may have profit boosts, such that incorporating an optional component will boost the projected profit for the product. An example of a profit boost, is that including a CD-ROM in a computer will boost profit by 10%. Components can be recursive, in that one component can be part of another component.

Both products 21 and components 22 have priorities. Priorities are used to determine the order in which tasks are scheduled. Thus, tasks for high priority products and components will have a better chance at obtaining resources.

A task model type 23 defines task models, each of which represents a task required to develop a given component. A task model type 23 has the following attributes: duration, variance, and resource alternatives. Resource alternates result in varying productivity (because of different durations and duration variances) and different costs for the task.

A resource model type 24 has the following attributes: capacities, calendars, a parent—the aggregation grouping of this resource, and cost structure. Capacity is finite but varies over time. For example, a design group that has six people until March when it will have seven. Resources are modeled hierarchically, enabling a planning funnel that specifies future aggregate plans as well as current specific plans.

Model 12 also provides "views", which are derived from the data of the model. These views, the portfolio 25 and pipeline 25, are constructed by the genetic algorithm 13 and constraint engine 14 and contain subsets of the model data.

A product portfolio view 25 defines a set of active products. The portfolio 25 is the result of a the product development planning process performed by the genetic algorithm 13 and constraint engine 14. Thus, it specifies a resolution of all the options and alternatives among each product's components. The portfolio 25 also specifies a schedule for selected components, that is, assignments of resources and start dates to tasks of those components.

A portfolio 25 has various financial measure attributes. Projected sales and projected costs are derived from bringing products to market according to the portfolio's schedule. A life-cycle cost has two components: development costs and production costs. Development costs are the sum total of costs for all tasks. Production costs are independently input and can be based on whatever factors the user desires. Projected profit is the projected life-cycle sales less projected costs.

As an example of obtaining costs, assume a selected product has Component Y. This component has certain associated tasks. A particular task might be performed on alternative resources, for example, a market research tasks might be performed an in-house resource or an outsource resource. Likewise, tasks might have timing choices. Because each resource has an associated cost structure, the selection of which tasks to do and when to do them results in a given cost.

A product pipeline view 26 is the set of resources and all the tasks scheduled on (assigned on) the resources for active products. Typically, all resource models will be used in the pipeline. Those tasks associated with selected components of active products will also be part of the pipeline. Like a portfolio 25, a pipeline 26 is the result of the product development planning process.

Optimization of the portfolio 26 means finding a portfolio with as high a profit (or other objective criterion) as possible. The problem is presented to genetic algorithm 13 and constraint engine 14 as a combinatorial search problem, and reduces to finding which component selections, resource selections, and timing selections produce the best portfolio.

The desired goal, such as projected profit, is optimized subject to various constraints. Examples of constraints are: development capacity, product/feature strategy (priority), time dependent sales, task precedence, frozen development commitments to resources, resource options, and costs. A example of a precedence constraint is that Task B must follow Task A. An example of a resource option constraint is that Task A can be done on Resource 1, 2, or 3, but not on Resource 4 or 5.

Time is represented to the day. The expected usage is that the planning horizon is one year to five years, with daily, weekly and monthly revision of various portions of the model instance data.

In a typical application, the product model type 21, the component model type 22, the task model type 23, and the resource model type 24, provide the initial enterprise model. Values for the model instances and their attributes are provided by the particular user. Values for the portfolio view 25 and pipeline view 26 are built dynamically during operation of system 10 by the genetic algorithm 13 and constraint engine 14.

An example of dynamically calculated model attributes is product development costs. Development costs are a function of a particular schedule (what resources are used and their timing) and are assigned values during the schedule building process of constraint engine 14. Development costs can be contrasted to projected production costs, which are input to model 12. However, as explained below, both are factors in finding an optimal product portfolio, for example, one that maximizes profit.

Constraint Engine and Genetic Algorithm

A feature of the invention is the use of both genetic algorithm 13 and constraint engine 14. The problem of providing an optimized portfolio is partitioned into two parts: prioritizing a set of products and scheduling tasks required to build a set of products.

In general, as explained in further detail below, genetic algorithm 13 is used to provide prioritized lists (sequences) of products. Constraint engine 14 is used to build a schedule of tasks required to design a given sequence of products, which involves resolving component, resource, and timing choices. In other words, the schedules built by constraint engine 14 resolve the resource choices and timing choices presented by the various task network attributes of components. Although these two components of system 10 are functionally distinct, they can be collectively referred to as an "optimizing engine".

Like conventional genetic algorithms, genetic algorithm 13 derives its behavior from a metaphor of the process of evolution. The processes in nature seem to boil down to objects competing for resources in the environment. Some objects are better equipped for survival and are more likely to survive and propagate their genetic material. In general, a genetic algorithm functions by applying operators (crossover and mutation) to a population of possible solutions referred to as "chromosomes". Crossover is analogous to the (simplified) genetic phenomenon when genetic material crosses over from one chromosome to another. The general process followed by genetic algorithm 14 is to evaluate the fitness of a set (population) of possible solutions (chromosomes). Then create a new population by performing operations such as crossover, reproduction, and mutation. Discard the old population and iterate using the new population.

An example of a genetic algorithm used for computer-implemented scheduling is described in U.S. Pat. No. 5,319,781, to G. Syswerda, entitled "Generation of Schedules Using a Genetic Procedure". Such an algorithm could be adapted for use with model 12 of the present invention. Other variations of genetic algorithms could also be used.

A commercially available product that provides both genetic algorithm 13 and constraint engine 14 is the RHYTHM OPTIMAL SCHEDULER tool, part of the RHYTHM family of products, from i2 Technologies, Inc. These tools could be adapted for use with model 12 to solve the problems to which the present invention is directed.

For purposes of the present invention, optimization can be posed as the following search problem: find a prioritization of products that optimizes projected profit when building a schedule against finite resources. The search space is a combination of choices of product priority, product configuration, execution strategy (e.g. make or buy), and execution time. As an example, an optimization problem might involve 200 product proposals, each with 10 options for different component configurations, each configuration generating a high-level factory order (routing) with 1.5 alternate resources at each operation and perhaps a year's time horizon.

Each chromosome of the genetic algorithm 13 represents a set of products having a particular prioritization, i.e., a product sequence. "Prioritization" as used herein means the ability of a product to obtain its preferred resources at its preferred times. A particular sequence of products represented by a chromosome corresponds to a prioritization of those products.

Priority can be a combination of user-input values and values assigned by genetic algorithm 13. For example, a set of 200 product proposals might be input to model 12 (by assigned values to product models 21) with 5 different priority categories, i.e., Priority Categories 1–5. In this case, genetic algorithm 13 can be used to resolve priorities within each category.

For a given set of products, say 50 products of Priority Category X, there will be 50! possible prioritizations (sequences). For a given sequence, constraint engine 14 is used to build an optimal schedule, to evaluate the schedule, and to assign a score to the schedule. This score is derived from a sum of penalty violations, if any, for each constraint. The score is then attached to the chromosome associated with the sequence. Genetic algorithm 13 then uses the chromosome and its score to regenerate new chromosomes.

Figure 3:
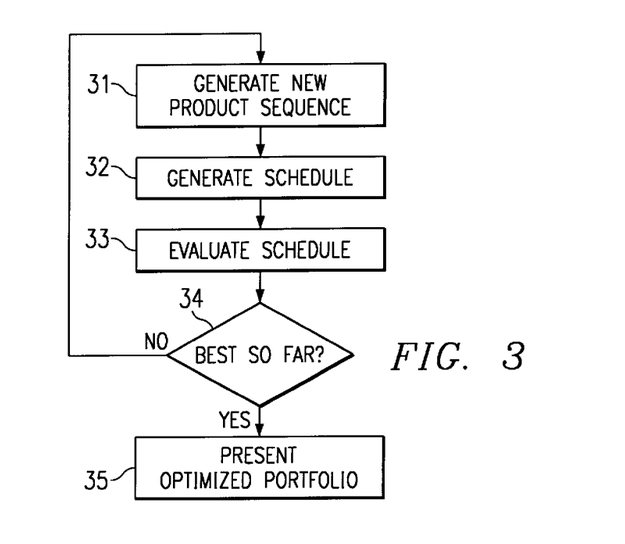
FIG. 3 illustrates the process performed by the genetic algorithm and constraint engine of FIG. 1.

FIG. 3 illustrates the process of the optimizing engine (genetic algorithm 13 and constraint engine 14). In Step 31, the genetic algorithm 13 generates a trial sequence of products. This trial sequence can be deemed a "proposed portfolio". In Step 32, the constraint engine 14 generates a schedule for this sequence, and in Step 33, it evaluates the schedule with a score. Step 34 is determining whether the sequence and schedule are the best so far, where "best" is determined by an objective criterion such as profit maximization. If not, the sequence and the score are returned to the genetic algorithm 13, which generates a new (and potentially better) sequence.

A feature of system 10 is its ability to provide either incremental or global optimization, as well as to respond to what-if hypotheses. For example, an incremental optimization might be requested if a certain component has failed. System 10 can be used to provide an alternative solution. A global optimization provides a proposed portfolio that optimizes a specified goal, such as profit. A model editing view for inputting "what-if" type queries is described below in connection with FIG. 9.

Presentation Interface

The presentation interface 18 supports a number of views, defined as displays that provide graphic representations of the model 12. Model 12 can be viewed differently for different purposes, such as when different personnel use model 12 for decision-making and monitoring relevant to their particular role in product development. As indicated below, views fall into three main categories: financial, program management, and resource allocation. All types of views can be used for both reporting and querying.

As illustrated, the screen displays are in a windows-type format, with graphical interface features commonly associated with this type of format. The user interacts with presentation layer 18 by using standard interface tools, such as a keyboard input and cursor movement with a pointing device (mouse). Various tool bars, menu bars, and file identifiers, above and below the displays, which are generic to windows-type displays, are not shown.

Figure 4:
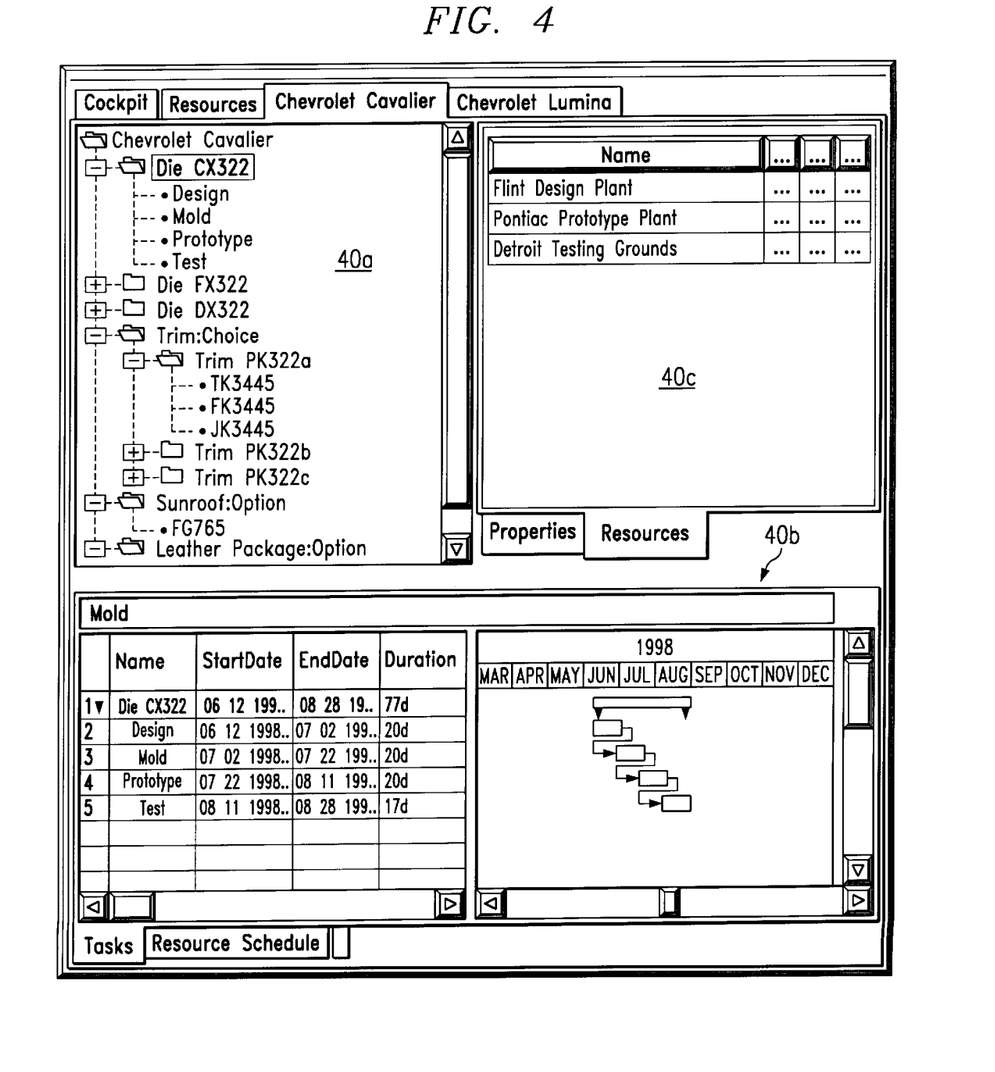
FIGS. 4–10 illustrate various views provided by the presentation layer of FIG. 1.

FIG. 4 is an example of a product definition view 40 of system 10. View 40 defines potential products and components, and has several windows 40a–40c. In the example of view 40, the product is an automobile—one of its components, a die, is shown with its various tasks. In window 40a, the product is viewed graphically in a "tree" structure. The tasks associated with a particular component can be viewed, such as those listed under Die CX322. Task window 40b lists these tasks with their start dates, end dates, and durations. Task window 40*b* also illustrates a task network, with dependency links between tasks. Completing a task network completes the design of the component. A resource window 40*c* illustrates the tasks required to design a specified component.

Figure 5:
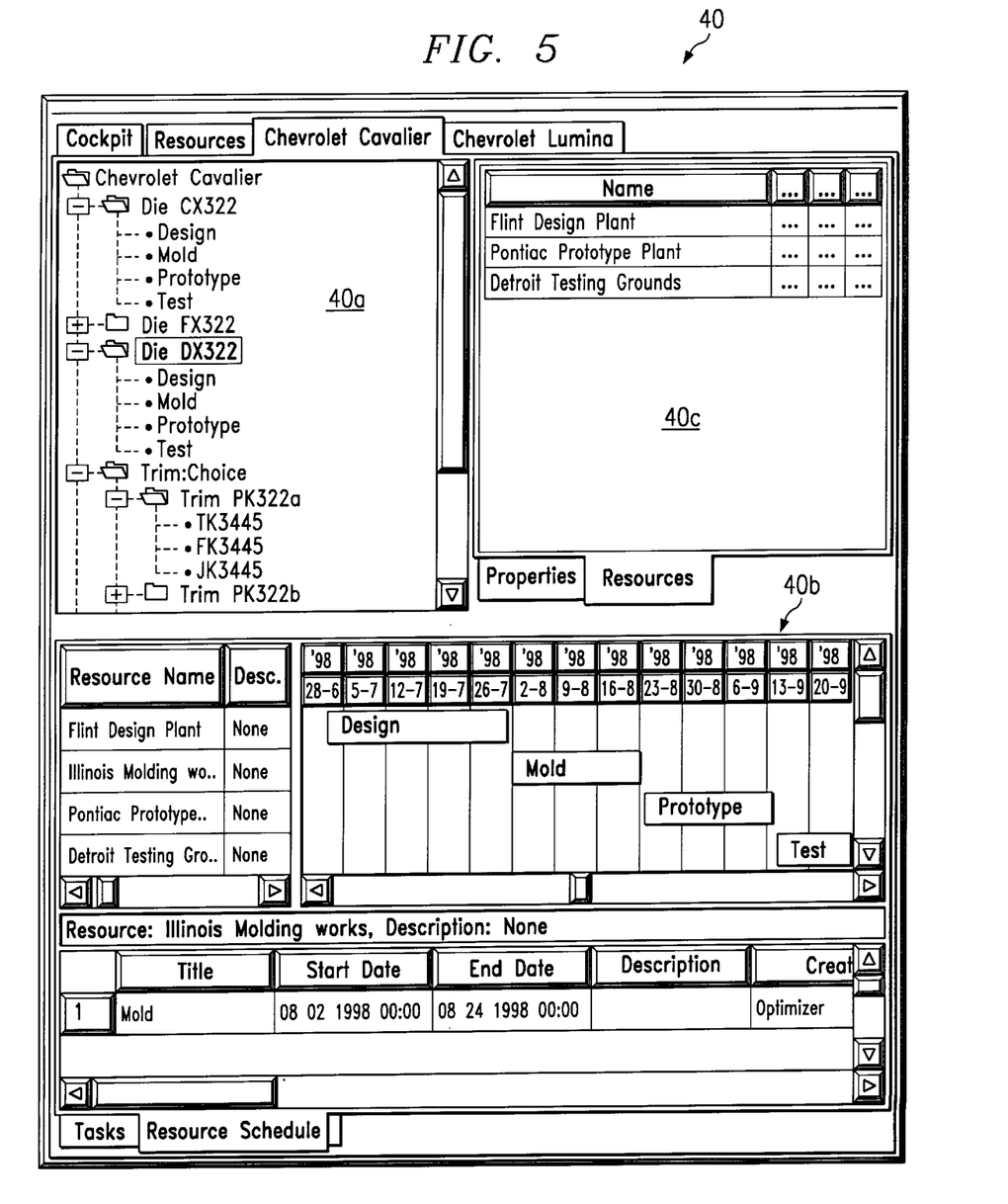

FIG. 5 illustrates view 40 with task window 40*b* replaced by resource schedule window 40*d*. As stated above, for a given task network associated with a component, once component, resource, and timing choices have been made, either manually or by constraint engine 14, a schedule can be displayed in window 40*c*. The combination of schedules for a complete portfolio comprises the pipeline view 25.

Figure 6:
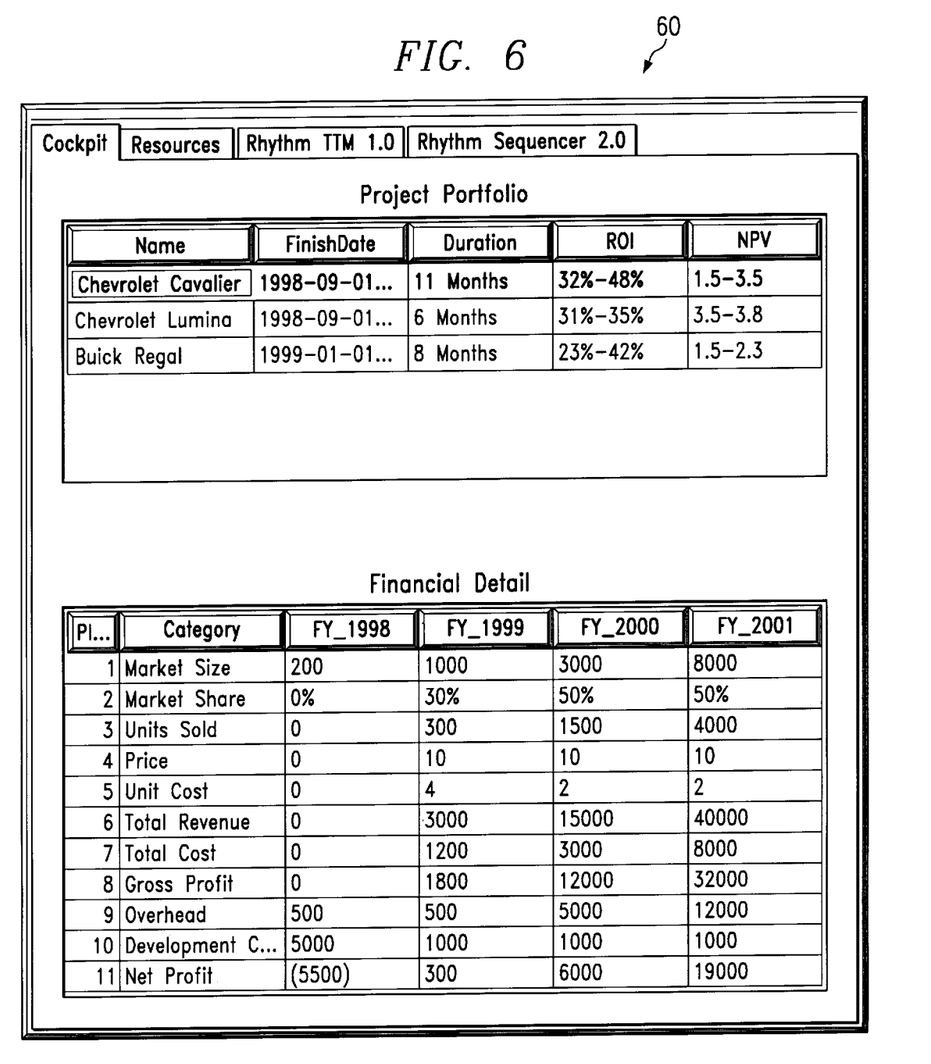

FIG. 6 illustrates a portfolio view 60 of model 12. View 60 lists each of the product models 21 selected for the portfolio, together with timing and financial data. The financial attributes associated with the portfolio, as described above, are used to provide portfolio summary financial detail.

Figure 7:
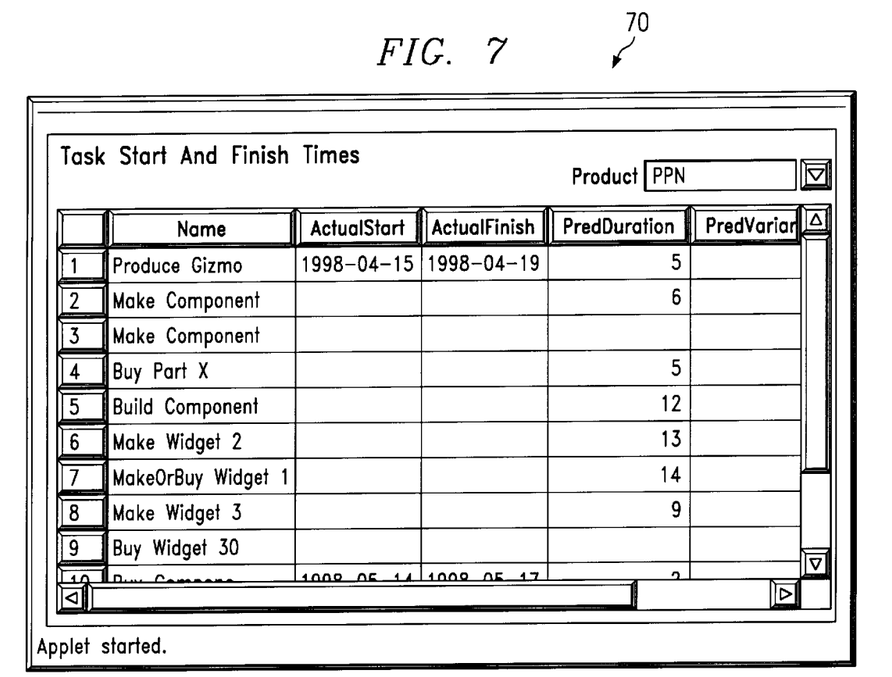

FIG. 7 illustrates a task progress view 70 of model 12. This view 60 illustrates, for a selected product, task progress, and variations from predicted timing.

Figure 8:
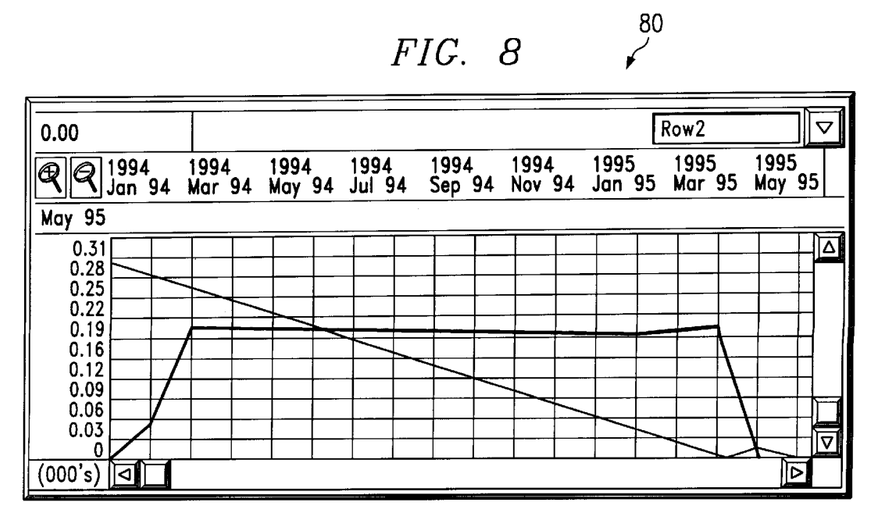

FIG. 8 is a sales projection view 80 of a product model 12. As stated above, each product has a projected sales attribute, which is used to provide view 80.

Figure 9:
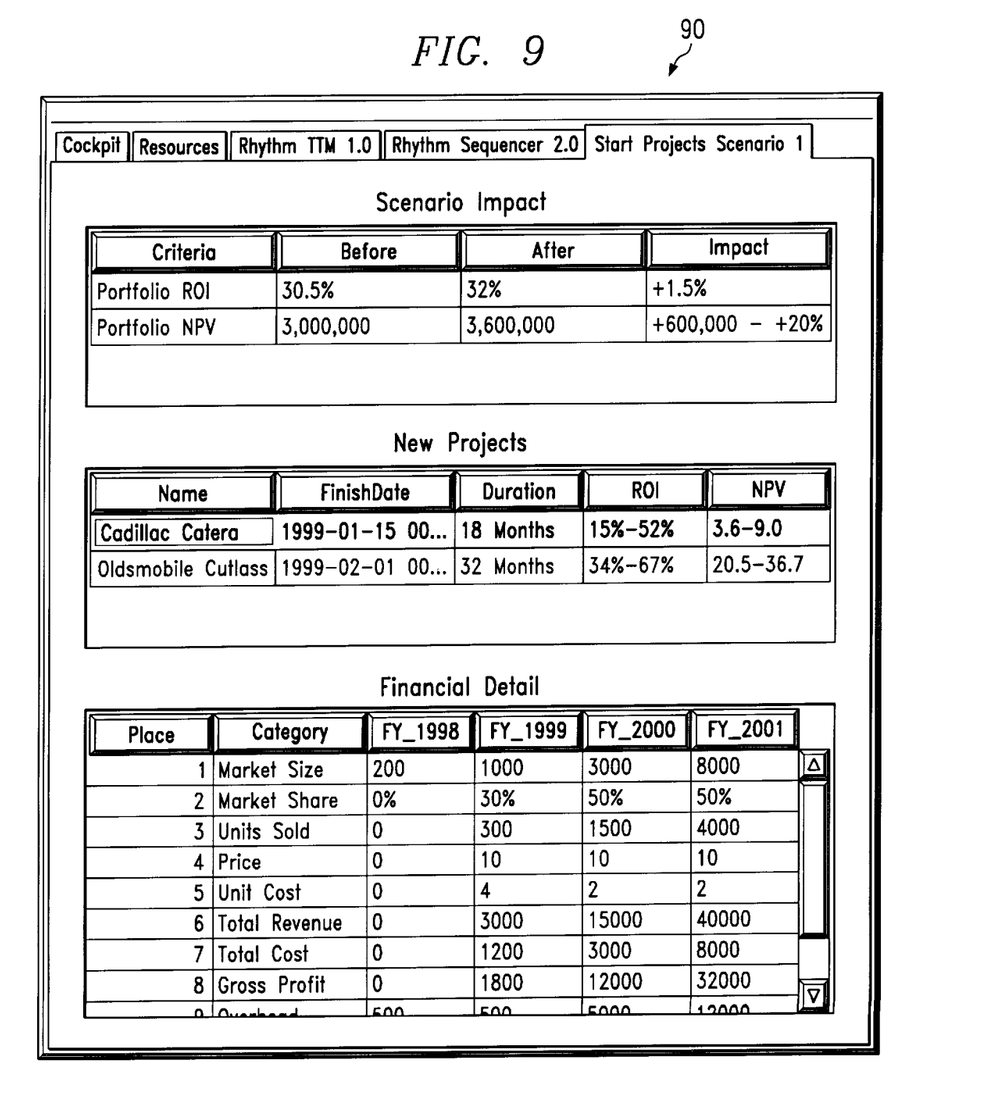

FIG. 9 is an "add project" view 90, illustrating the "what-if" capabilities of constraint engine 14. View 90 permits the user to add a product model 21 to portfolio 25. Engine 14 modifies the pipeline model 25, and calculates and displays the financial results.

Figure 10:
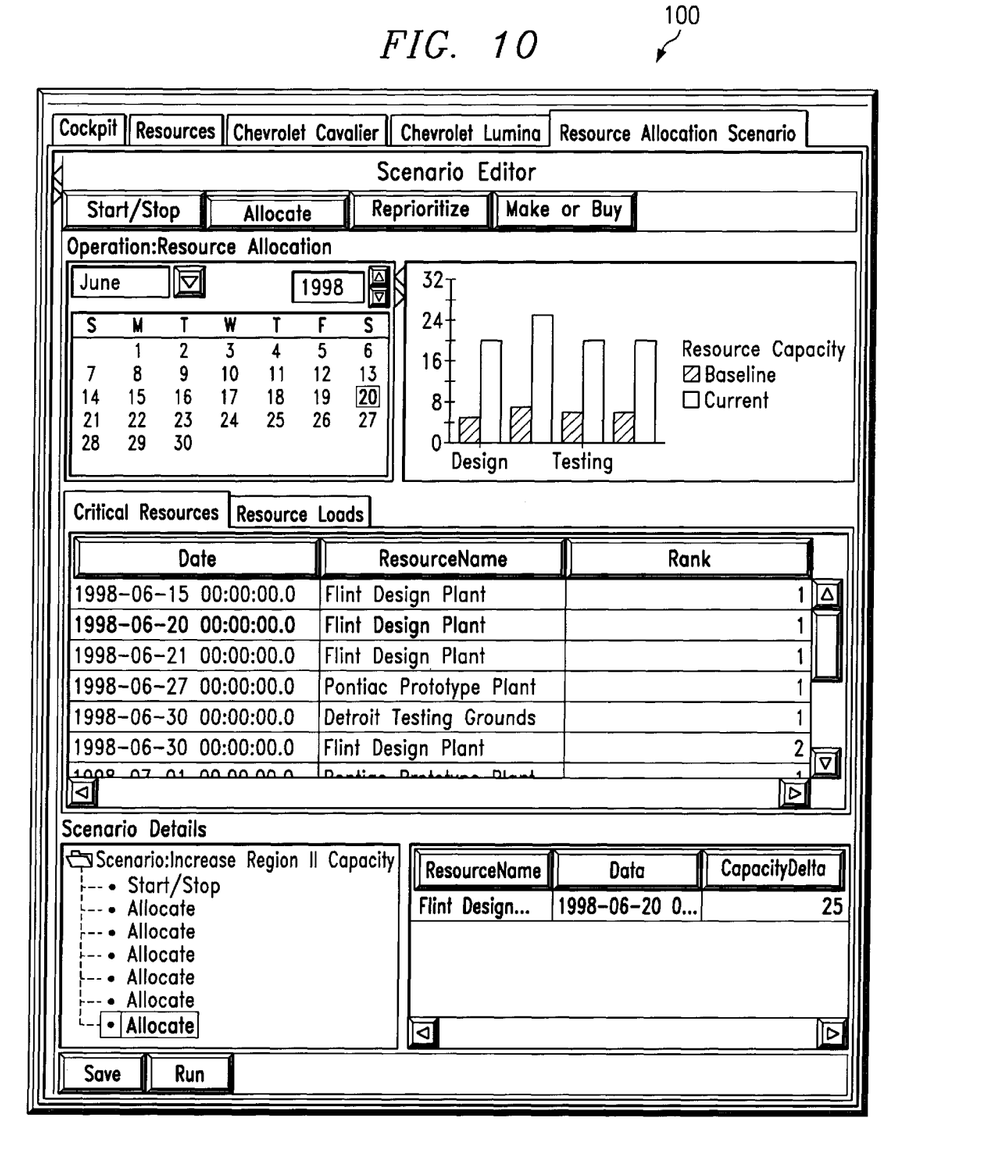

FIG. 10 illustrates a scenario editor view 100. View 100 permits a manager or other personnel to create an investment scenario consisting of investments (or divestments) in various resource models 24. Constraint engine 14 then calculates financial results based on the current portfolio 25 and pipeline 26 and displays these results (not shown).

Other Embodiments

Although the present invention has been described in detail, it should be understood that various changes, substitutions, and alterations can be made hereto without departing from the spirit and scope of the invention as defined by the appended claims.

What is claimed is:

1. A computer system for modeling product development, comprising:
   a plurality of product models defined from a product model type and stored by the computer system, each product model representing a product proposed to be manufactured by an enterprise;
   a plurality of component models defined from a component model type and stored by the computer system, each component model representing a component from which a product is made;
   a plurality of task models defined from a task model type and stored by the computer system, each task model representing a task to be performed in the development of a component;
   a plurality of resource models defined from a resource model type and stored by the computer system, each resource model representing a resource available for use in performing a task;
   at least one pipeline view that represents a set of tasks and assigned resources for producing a set of products; and
   at least one product portfolio view that represents a set of the products.

2. The system of claim 1, further comprising a genetic algorithm for providing candidate portfolios for the portfolio view.

3. The system of claim 2, wherein chromosomes of the genetic algorithm represent potential product sequences.

4. The system of claim 1, further comprising a constraint engine for building candidate schedules for the pipeline view, wherein the constraint engine builds the schedules subject to constraints associated with the model.

5. The system of claim 4, wherein the constraint engine evaluates each schedule with a score based on whether the constraints are violated.

6. The system of claim 1, wherein the portfolio view provides financial measures associated with a portfolio.

7. The system of claim 1, wherein the task model type comprises a resource alternative attribute representing alternative resources for performing a task.

8. The system of claim 1, wherein the component model type comprises a task network attribute representing the tasks for providing a component.

9. The system of claim 1, wherein the resource model type comprises a capacity attribute representing rules for allocating resources to tasks.

10. A product development planning system, comprising:
    an optimizing engine having a genetic algorithm and a constraint engine;
    an enterprise model having at least the following components: a plurality of product models defined from a product model type and stored by the computer system, each product model representing a product proposed to be manufactured by an enterprise; a plurality of component models defined from a component model type and stored by the computer system, each component model representing a component from which a product is made; a plurality of task models defined from a task model type and stored by the computer system, each task model representing a task to be performed in the development of a component; a plurality of resource models defined from a resource model type and stored by the computer system, each resource model representing a resource available for use in performing a task; at least one pipeline view representing a set of tasks and assigned resources for producing a set of products; and at least one product portfolio view representing a set of the products;
    the genetic algorithm is operable to provide sequences of products as candidates for the portfolio view;
    the constraint engine being operable to provide schedules for the sequences subject to constraints of the enterprise model; and
    the genetic algorithm and the constraint engine being operable to cooperate to evaluate the sequences in terms of constraint violations and to improve the sequences, thereby providing the portfolio view and the pipeline view.

11. The system of claim 10, wherein the optimizing engine is operable to respond to variations in the model input by a user, by modifying the portfolio view as incrementally affected by the variation.

12. The system of claim 10, wherein chromosomes of the genetic algorithm represent potential product priorities.

13. The system of claim 10, wherein the constraint engine evaluates each schedule with a score based on whether the constraints are violated.

14. The system of claim 10, wherein the portfolio view provides financial measures associated with the portfolio.

15. The system of claim 10, wherein the task models further represent resource alternatives for performing tasks.

16. The system of claim 10, wherein the component model type has a task network attribute representing the tasks for providing a component.

17. The system of claim 10, wherein the sequences are evaluated such that profit from the sequence is maximized.

18. The system of claim 10, further comprising a presentation layer for providing displays of the views and the model.

19. The system of claim 10, wherein the resource model type has a capacity attribute representing rules for allocating resources to tasks.

20. A method for product development planning, comprising:

modeling an enterprise with an enterprise model having at least the following components: a plurality of product models defined from a product model type and stored by the computer system, each product model representing a product proposed to be manufactured by the enterprise; a plurality of component models defined from a component model type and stored by the computer system, each component model representing a component from which a product is made; a plurality of task models defined from a task model type and stored by the computer system, each task model representing a task to be performed in the development of a component; and a plurality of resource models defined from a resource model type and stored by the computer system, each resource model representing a resource available for use in performing a task and rules for allocating the resource to the task;

selecting a sequence of the products as a candidate portfolio;

building a schedule for the sequence using a constraint engine that builds the schedule subject to constraints of the model;

evaluating the sequence in terms of violations of the constraints;

generating a new sequence based on the results of the evaluating step using a genetic algorithm; and repeating the building, evaluating, and generating steps for a number of iterations.

21. The method of claim 20, further comprising responding to variations in the enterprise model input by a user by modifying a portfolio view as incrementally affected by the variation, the portfolio view representing a set of products.

22. The method of claim 20, further comprising selecting a sequence of the products using potential product priorities.

23. The method of claim 20, further comprising evaluating each schedule with a score based on whether the constraints are violated.

24. The method of claim 20, wherein the task models further represent resource alternatives for performing tasks.

25. The method of claim 20, wherein the component model type comprises a task network attribute representing the tasks for providing a component.

26. The method of claim 20, further comprising evaluating the sequences such that profit from the sequences is maximized.

27. The method of claim 20, further comprising providing a presentation layer that provides displays of the enterprise model.

28. The method of claim 20, wherein the resource model type comprises a capacity attribute representing rules for allocating resources to tasks.

* * * * *